(No Model.) 3 Sheets—Sheet 1.
G. WESTINGHOUSE, Jr.
FLUID PRESSURE GAGE TESTER.
No. 287,894. Patented Nov. 6, 1883.
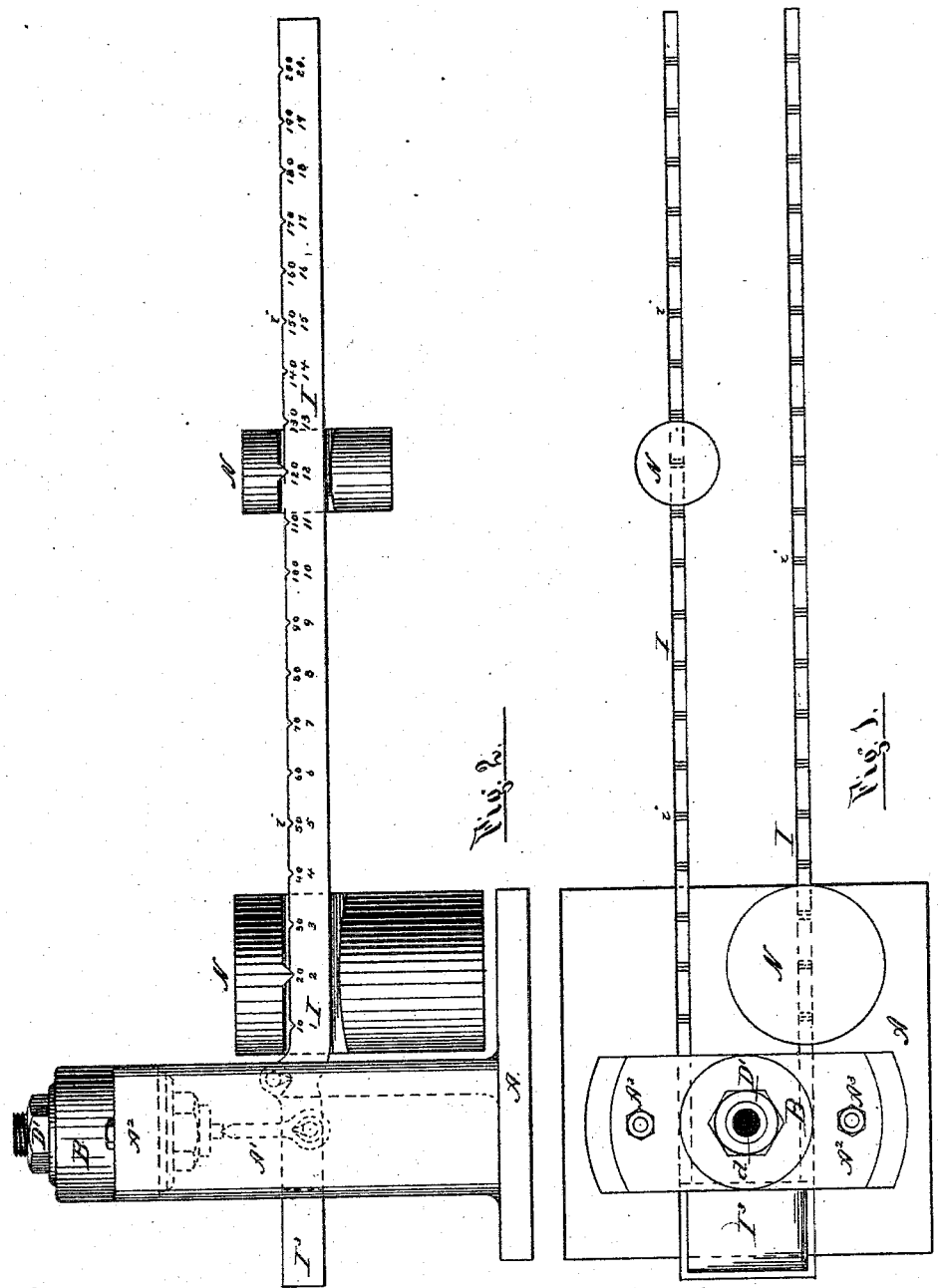

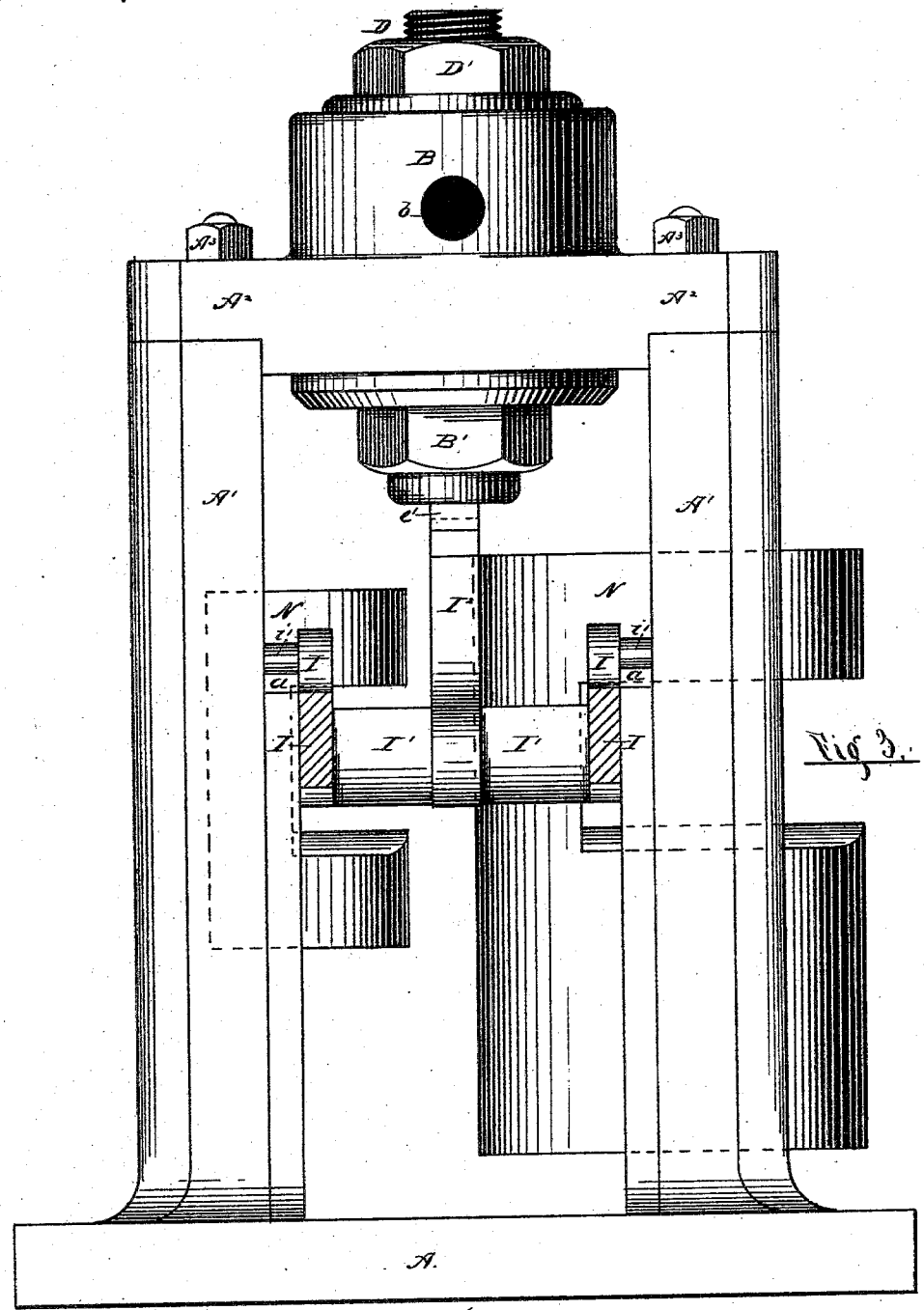

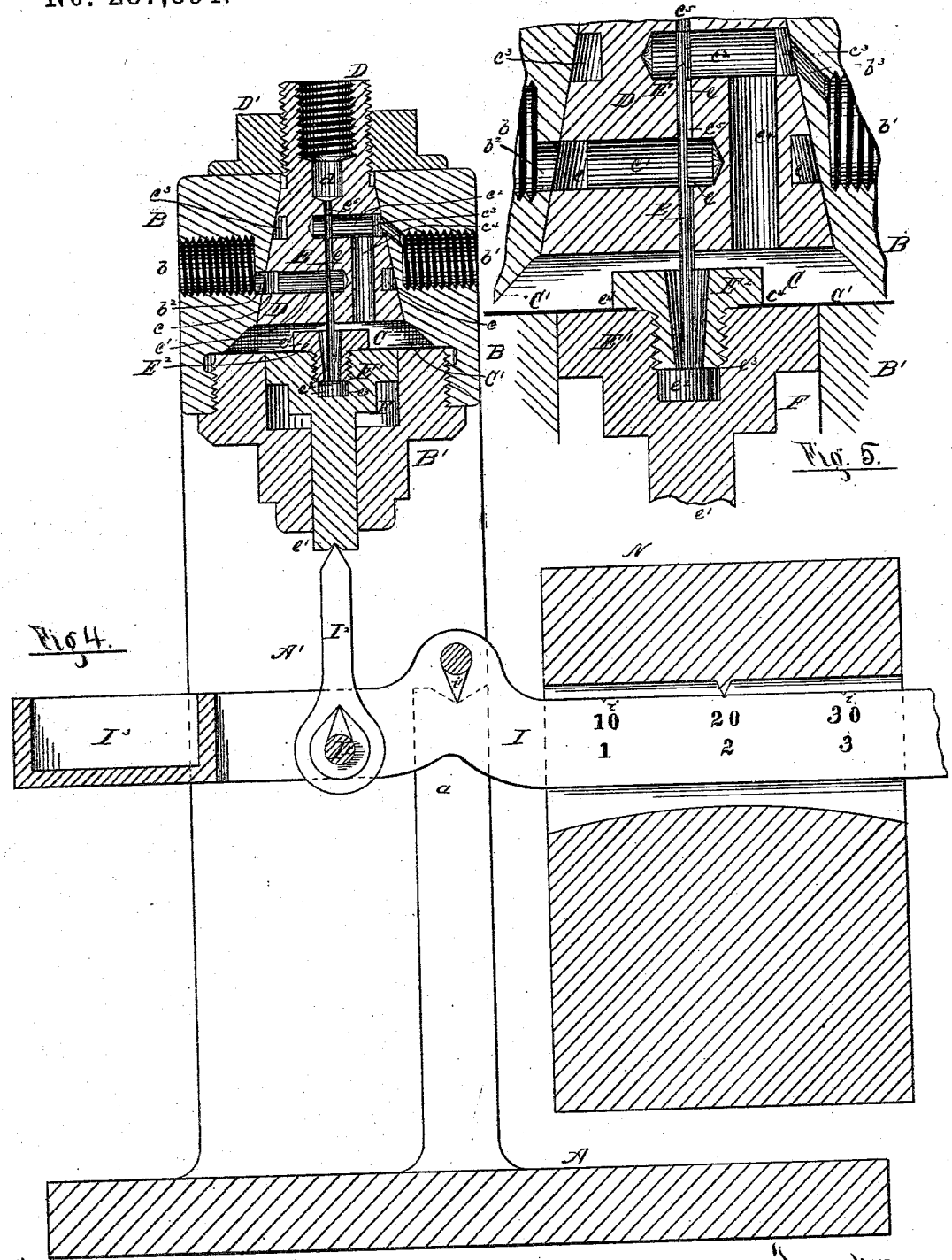

UNITED STATES PATENT OFFICE.

GEORGE WESTINGHOUSE, JR., OF PITTSBURG, PENNSYLVANIA.

FLUID-PRESSURE-GAGE TESTER.

SPECIFICATION forming part of Letters Patent No. 287,894, dated November 6, 1883.

Application filed April 23, 1883. (No model.)

*To all whom it may concern:*

Be it known that I, GEORGE WESTINGHOUSE, Jr., a citizen of the United States, residing at Pittsburg, county of Allegheny, State of Pennsylvania, have invented or discovered a new and useful Improvement in Fluid-Pressure-Gage Testers; and I do hereby declare the following to be a full, clear, concise, and exact description thereof, reference being had to the accompanying drawings, making a part of this specification, in which—like letters indicating like parts—

Figure 1, Sheet 1, is a top plan view of my improved gage-tester. Fig. 2 is a side elevation of the same. Fig. 3, Sheet 2, is an end elevation, looking toward the right, Fig. 2, the scale-beam being in section, and the scale of drawing being larger than Figs. 1 and 2. Fig. 4, Sheet 3, is a longitudinal sectional view drawn to the same scale as Fig. 3, and Fig. 5 is an enlarged view of a portion of the mechanism shown in section, Fig. 4.

My invention relates to mechanism for testing fluid-pressure gages; and in general terms it consists of certain combinations of a body or case having communicating ports and passages therethrough, a rod-like valve operative at different points in its length in opening and closing fluid supply and escape through such passages, a piston for actuating the valve, such piston being moved in one direction by pressure of fluid thereon, and a graduated scale-beam with movable weights for pressing the piston in the opposite direction, the degree of such pressure being indicated in units of weight, as hereinafter more fully described and claimed.

In the drawings, A represents a foot or base plate carrying two uprights, A′ A′, and an upper cross-bar, $A^2$, the uprights being by preference cast solid with the base, and the cross-bar secured thereto by bolts $A^3$, or in other suitable way to afford requisite strength and stability.

Upon the bar $A^2$ is cast or secured a case or body, B, having therein a threaded opening, $b$, for connection of fluid-supply pipe, (air, steam, water, or other medium,) and a similar opening, $b'$, for connection of the gage to be tested, or of a pipe leading to such gage. For convenience in construction, this case or body is made of separate parts, consisting of an outer shell and inner plug, D, which latter is by preference of conical form, and secured at its upper protruding end by nut D′, whereby the plug may be drawn tightly to its seat. Surrounding the plug near its base is an annular passage, $c$, communicating with inlet $b$ by port $b^2$. From the annular passage $c$ a passage, $c'$, leads to a small passage, $c^5$, made axially through the plug, which is occupied by a regulating-valve, E. Above the passage $c'$ a passage, $c^2$, leads from the valve-opening through annular passage $c^3$ and port $b^3$ to the gage-opening $b'$, and also through passage $c^4$ to chamber C. At its upper end the valve-opening $c^5$ communicates with the escape $d$.

The valve E, as shown, is of a stem or rod form, and performs its function as a valve by virtue of the presence of a cut-away or flattened part or notch, $e$, in the side thereof, said notch being somewhat longer than the distance between the adjacent sides of the passages $c'$ $c^2$, and also by the fact that its extreme upper end, $e^6$, performs the function of opening and closing communication between the ports or passages $c^2$ and $d$. In so doing the valve has somewhat the operation of a piston-valve, and it is employed both to regulate or control fluid-passage from $c'$ to $c^2$, which affords supply to chamber C and the gage, and also to open and close escape through $d$ from the chamber and gage. For this purpose the length of the valve from the upper end of notch $e$ to its upper extremity, $e^6$, is equal or about equal to the diameter of passage $c^2$, or is made such that by a slight downward movement of the valve inflow from $c'$ to $c^2$ will be closed and the escape from $c^2$ to $d$ be opened; or by a slight upward movement inflow will be opened through notch $e$ and escape through $d$ be closed. This feature of regulating fluid-pressure by controlling both the inflow and the escape with comparatively slight valve movement affords a high degree of sensitiveness and corresponding accuracy, whereby any desired degree of fluid-pressure, either equal to or below the maximum in inlet $c'$, may be maintained in the gage and in chamber C. In order to secure these movements of the valve by automatic adjustment of the apparatus to a predetermined standard, I make use of a piston, E', movable within a cylinder or chamber, F, in the head B', which latter makes screw-connection with the lower end of shell B, thereby closing chamber C. This piston E' is exposed on its inner face to fluid-pressure in chamber C, which, as before stated, is equal to that in the gage; and in order to pack the piston to prevent leakage, without materially obstructing freedom of movement, a light flexible diaphragm, C', is secured over the face of the piston, being clamped at its periphery between abutting shoulders on the head B' and shell B, and at its center between the face of the piston and a flange, $e^4$, on the screw-plug $E^2$. This plug is also operative in holding the collar or head $e^2$ of the valve-stem E within its socket $e^3$, formed in the center of the piston, the stem of the valve being passed through the conical or loosely-fitting passage $e^5$ in the plug, whereby a flexible connection is secured between the valve and piston, and freedom of movement without binding. Movement is imparted in one direction by pressure of fluid on the inner face of the piston, by which the inflow is reduced or arrested and the escape is opened. Movement in the opposite direction, operative in opening the inflow and closing the escape, is imparted by mechanical pressure on the opposite side of the piston, or on its stem e', which stem also serves as a guide by passing through the head B'. In order to effect such mechanical pressure, and at the same time secure an accurate measure of the same in units of weight, I make use of a scale-beam, I, formed by preference of two arms graduated in the usual manner—say for units and tens—as indicated at i. The graduation shown is conventional, and designed for illustration, without accuracy in position or subdivision of scale, since the requirements of scales of this character are well known, and can be accurately and correctly made by the skilled mechanic.

Each arm of the scale-beam has a fulcrum on its adjacent upright A' by knife-edge pivot i', resting upon off-set bearings a. (See Figs. 3 and 4.) Also, the knife-edge cross-bar I' affords a similar pivot-bearing for a post, $I^2$, which bears by its upper wedge-point against the protruding end of stem e'. A box, $I^3$, at the end of the scale-beam connects its two bars, and affords a receptacle for balance-weights, (shot-pellets or similar weights,) with which the beam may be balanced on its pivots.

By adjusting the scale-weights N, one being for units and one for tens, on the graduated bars of the beam, upward pressure upon the piston may be made great or small, and the amount of such pressure be determined in such units as may be provided—say in pounds and fractions of a pound—corresponding to the usual graduations on the dials of pressure-gages. The amount of upward pressure thus exerted by the scale-beam determines the degree of fluid-pressure in chamber C, and also in the gage connected at b', because increase in fluid-pressure above the scale-beam pressure will depress the piston and valve and reduce or arrest fluid supply and pressure. On the other hand, if fluid-pressure in chamber C and in the gage be less than that imparted by the scale-beam, the piston and valve will be raised and the fluid-supply be increased. By means of this operation of the valve the pressure in chamber C and in the gage will be adjusted automatically to any predetermined standard or degree made by the scale-beam. For example, assuming the area of piston E' to be one inch, and the weights N to be set for, say, two pounds of pressure by the scale-beam upon the piston, then through the automatic operation of valve E fluid will be admitted to the gage and into chamber C under pressure of two pounds per square inch, thereby securing and maintaining an equilibrium of pressure upon the piston and balancing the scale-beam. If, on the other hand, a certain degree of fluid-pressure is active in chamber C and in the gage—say five pounds per square inch—and the weights N are adjusted to give a less pressure by the scale-beam—say two pounds—upon the piston, then the excess of fluid-pressure above the piston will depress the piston and valve, reducing or arresting the supply and opening the escape, thereby reducing the fluid-pressure equally in chamber C and in the gage until by the automatic operation above described the valve assumes such position as to establish and maintain equilibrium of pressure on the piston and a balance of the scale-beam. Substantially the same automatic balancing of fluid-pressure against any predetermined pressure of the scale-beam takes place throughout the whole range of adjustment of the weights N, either up or down the scale, assuming, of course, that fluid-supply is afforded through passage c' with sufficient initial pressure.

In practice fluid—preferably water—is supplied having the maximum pressure for which test is to be made. The scale-weights are then set in succession for degrees of pressure indicated by registration on the gage dial or scale. At each such successive adjustment of the weights, whether for increase or decrease of beam-pressure, the fluid-pressure in the gage will be adjusted thereto automatically, thereby establishing equilibrium of pressure and balancing the beam. When such balance is secured, the scales on the gage and beam may be read and directly compared, to determine agreement or disagreement, the beam-scale being the standard of comparison. This operation may be repeated throughout the entire scale of the gage, either for the purpose of marking the graduations thereon in the first instance or for testing the accuracy of graduations previously made.

Various modifications may be made in the details of construction without departing from my invention. For example, instead of the receptacle I³ for balancing the scale-beam, a screw-weight may be employed, similar to those commonly used for balancing scales; also, other known or suitable form of beam may be used; or, instead of a beam and movable weights, a spring may be employed to press upward on the piston, with provision similar to that made in spring-balances for determining such pressure in pounds or other desired units.

The necessary range of motion of the valve and piston is small, and the diaphragm C' affords a cheap and efficient means of packing the same; but other suitable or well-known methods of packing pistons may be substituted for the diaphragm; or a closely-fitting piston may be employed without packing, in case fluid-supply is sufficient, so that a small amount of leakage may be disregarded; also, a diaphragm similar to those commonly employed in fluid-pressure regulators may be substituted for the piston for the purpose of actuating the regulating-valve; but I prefer the piston, among other reasons, because more accurate and uniform conditions of pressure can be secured by it than by a diaphragm; also, instead of making the shell B and plug D of separate pieces, as shown, the two may be made solid or of one piece, and the several ports and passages be drilled or otherwise formed therein, the plug, with its annular ports, being made separate in the present instance simply for convenience in construction.

In the foregoing description the area of piston E' has been assumed to be one inch; but in practice this area may be increased or diminished at pleasure, thereby rendering the apparatus more or less sensitive to changes in fluid-pressure.

These and other like or equivalent modifications in construction I consider as coming within my invention.

I claim as my invention—

1. In a fluid-pressure-gage tester, the combination of a movable piston, a mechanism for applying a definite degree of pressure expressed in units of weight to the piston in one direction, and a rod-like valve having an intermediate reduced portion for fluid-passage, such valve being operative by the motion which it takes from the piston to open and close fluid-pressure supply and exhaust ports intermediate between the fluid-inlet on one side and the gage-port and piston-chamber on the other side, whereby the fluid-pressure operative in the gage and on the piston shall automatically be varied to the mechanical pressure operative to move the piston, substantially as set forth.

2. A case having a fluid-supply passage communicating with an escape and with passages leading to a piston-chamber and a gage-connection, in combination with a rod-like valve operative at different parts of its length for regulating flow of fluid from the supply to the piston-chamber and gage, and from the last two to the escape, a piston carrying the valve and exposed on one side to fluid-pressure in its chamber, and a pivoted scale-beam for imposing upon the piston a predetermined degree of pressure indicated in units of weight, substantially as set forth.

3. The combination of case B, having inlet and outlet $b$ $b'$, plug D, having passages $c'$, $c^2$, and $d$, valve E for opening and closing the escape $d$, and for opening and closing communication from $c'$ to $c^2$, and piston E' for operating the valve, the piston-chamber having fluid communication with passage $c^2$, substantially as set forth.

4. A case having a supply-passage, $c'$, and escape $d$, and a passage, $c^2$, communicating with both $c'$ $d$ and with a piston-chamber and gage-connection, in combination with a piston in such chamber, and a valve operated thereby, such valve having a cut-away portion, $e$, and being operative, substantially as described, in opening and closing communication both from $c'$ to $c^2$ and from $c^2$ to $d$.

5. The combination of a case having a supply-passage therein with an escape-port, a gage-port, and a piston-chamber communicating with the supply-passage, a piston movable within the chamber, and a rod-like valve moved longitudinally by the piston, and operative at different points in its length in opening or closing communication between the supply-passage and the gage port and chamber, and also between the two latter and the escape, substantially as set forth.

In testimony whereof I have hereunto set my hand.

GEORGE WESTINGHOUSE, JR.

Witnesses:
 R. H. WHITTLESEY,
 C. L. PARKER.